(12) United States Patent
Dewinter

(10) Patent No.: US 7,674,511 B2
(45) Date of Patent: *Mar. 9, 2010

(54) CLOSED REINFORCEMENT FIBER PACKAGE, AS WELL AS CHAIN PACKING CONSISTING OF SUCH CLOSED PACKAGES

(75) Inventor: Ronny Dewinter, Kuurne (BE)

(73) Assignee: NV Bekaert SA, Zwevegem (BE)

( * ) Notice: Subject to any disclaimer, the term of this patent is extended or adjusted under 35 U.S.C. 154(b) by 108 days.

This patent is subject to a terminal disclaimer.

(21) Appl. No.: 11/226,313

(22) Filed: Sep. 15, 2005

(65) Prior Publication Data

US 2006/0008613 A1    Jan. 12, 2006

Related U.S. Application Data

(63) Continuation of application No. 10/687,973, filed on Oct. 20, 2003, now Pat. No. 7,001,657, which is a continuation of application No. PCT/EP02/02455, filed on Mar. 5, 2002.

(30) Foreign Application Priority Data

May 4, 2001    (BE)    ................... 2001/0309

(51) Int. Cl.
*B32B 5/12* (2006.01)

(52) U.S. Cl. .............. 428/113; 428/114; 428/36.4; 428/294.1; 428/399; 206/524.7; 53/546

(58) Field of Classification Search .............. 428/113, 428/399, 36.4, 114, 293.7, 34.5; 206/524.7; 53/546

See application file for complete search history.

(56) References Cited

U.S. PATENT DOCUMENTS

| | | |
|---|---|---|
| 1,916,531 A | 10/1933 | Robb |
| 3,199,671 A | 8/1965 | Davy |
| 3,492,782 A * | 2/1970 | Gerding ................... 53/525 |
| 3,813,848 A | 6/1974 | Romagnoll ................ 53/546 |
| 4,119,227 A | 10/1978 | Hafner et al. |
| 4,798,508 A | 1/1989 | Lewis |

(Continued)

FOREIGN PATENT DOCUMENTS

BE    1009507 A3    4/1997

(Continued)

OTHER PUBLICATIONS

Patent Abstract of Japan, public. date Oct. 31, 2000, public. No. 2000302493 for application No. 11104089 to Shimizu Corp., filed Apr. 12, 1999, (1 page).

(Continued)

*Primary Examiner*—Jane Rhee
(74) *Attorney, Agent, or Firm*—Shlesinger, Arkwright & Garvey LLP

(57) ABSTRACT

Closed reinforcement fiber package includes a material disintegratable in concrete, such as fiber concrete. Reinforcing fibers are present in a loose form in the package. The reinforcing fibers may be provided in a substantially mutually parallel position in the package. The reinforcement fiber package may be provided in a chain packing or package including a number of such closed reinforcement fiber packages. The reinforcing fibers may be made of steel.

17 Claims, 3 Drawing Sheets

U.S. PATENT DOCUMENTS

Figure 1:
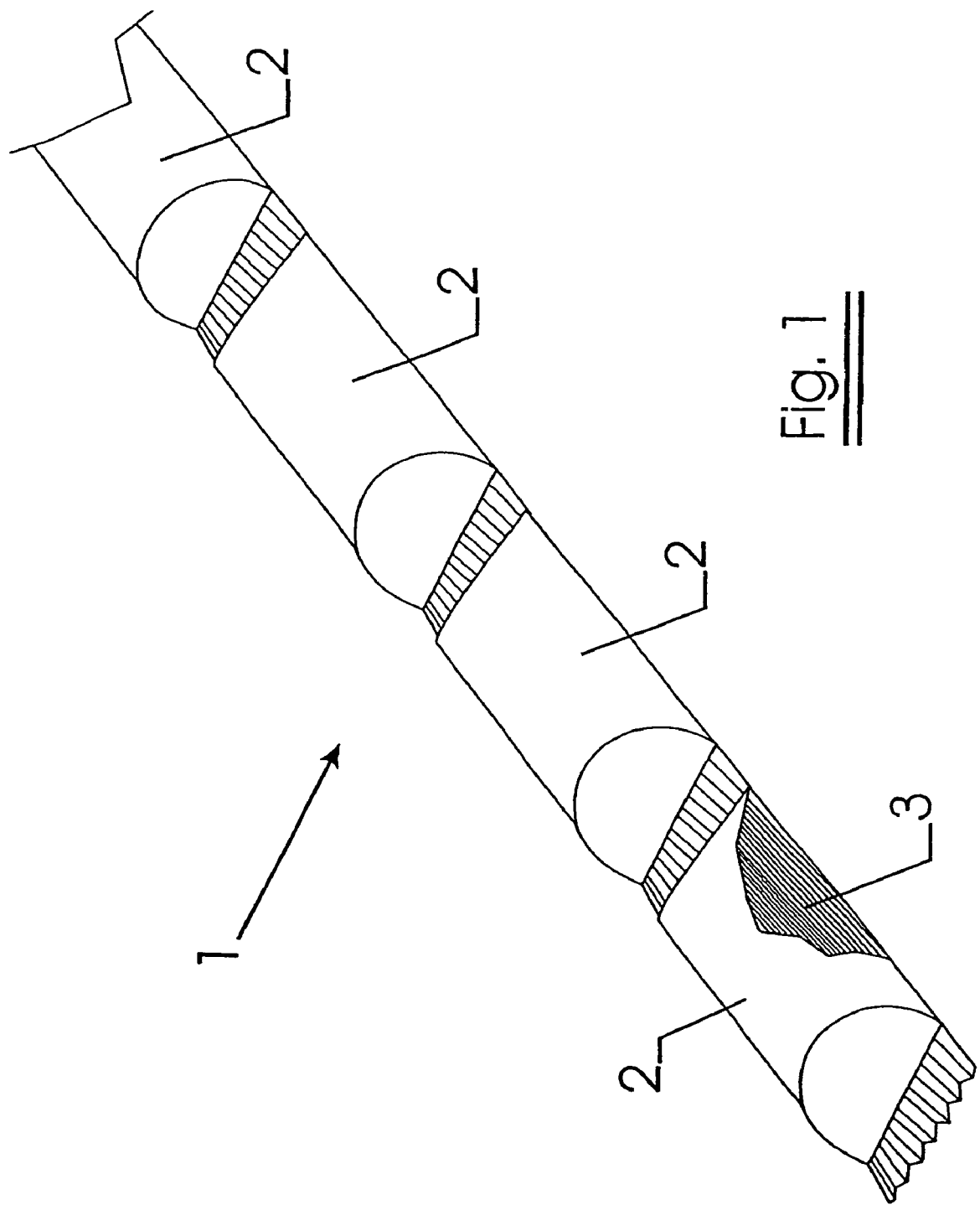

| | | | |
|---|---|---|---|
| 4,946,339 A | | 8/1990 | Berg et al. |
| 4,961,790 A | * | 10/1990 | Smith et al. ............... 106/823 |
| 5,224,595 A | | 7/1993 | Sugimoto et al. ........... 206/321 |
| 5,224,774 A | | 7/1993 | Valle et al. .................... 366/2 |
| 5,285,930 A | | 2/1994 | Nielsen |
| 5,807,458 A | | 9/1998 | Sanders et al. |
| 6,197,423 B1 | | 3/2001 | Rieder et al. |
| 6,235,108 B1 | | 5/2001 | Lambrechts ............... 106/644 |
| 6,348,093 B1 | | 2/2002 | Rieder et al. |
| 6,550,362 B1 | * | 4/2003 | Galinat et al. ................. 83/23 |
| 6,562,430 B1 | * | 5/2003 | Leon ............................ 428/43 |
| 6,945,686 B2 | | 9/2005 | Dewinter |
| 7,001,657 B2 | * | 2/2006 | Dewinter ................... 428/113 |

FOREIGN PATENT DOCUMENTS

| | | |
|---|---|---|
| DE | 3412216 A1 | 10/1985 |
| DE | 44 27 156 A1 | 2/1996 |
| DE | 4427156 A1 | 2/1996 |
| DE | 297 14 704 U1 | 11/1997 |
| DE | 29714704 U1 | 11/1997 |
| DE | 199 11 426 A1 | 2/2000 |
| DE | 19911426 A1 | 2/2000 |
| EP | 0 499 572 A1 | 8/1992 |
| EP | 0 499 573 A1 | 8/1992 |
| FR | 2 672 045 A1 | 7/1992 |
| FR | 2672045 A1 | 7/1992 |
| WO | 91/14551 | 10/1991 |
| WO | 96/02715 | 2/1996 |
| WO | WO9602715 | 2/1996 |
| WO | 01/81265 | 11/2001 |
| WO | 01/81265 A2 | 11/2001 |

OTHER PUBLICATIONS

2244 Research Disclosure (1995) January, No. 369 Emsworth, GB, 36924, entitled: Water-Soluble Bags For Containing Reinforcing Steel Fibres, Disclosed anonymously, (1 page).

International Search Report for application No. PCT/EP02/02455 to N. V. Bekaert S.A. et al., filed Mar. 5, 2002, dated Jul. 26, 2002 (3 pages).

International Search Report for application No. PCT/EP02/04566 to N.V. Bekaert S.A. et al., filed Apr. 24, 2002, dated Sep. 30, 2002 (3 pages).

International Search Report for PCT/EP02/02455, filed Mar. 5, 2002, Report dated Jul. 26, 2002, (3 pages).

International Search Report for PCT/EP02/04566, filed, Apr. 24, 2002, Report dated Sep. 30, 2002 (3 pages).

\* cited by examiner

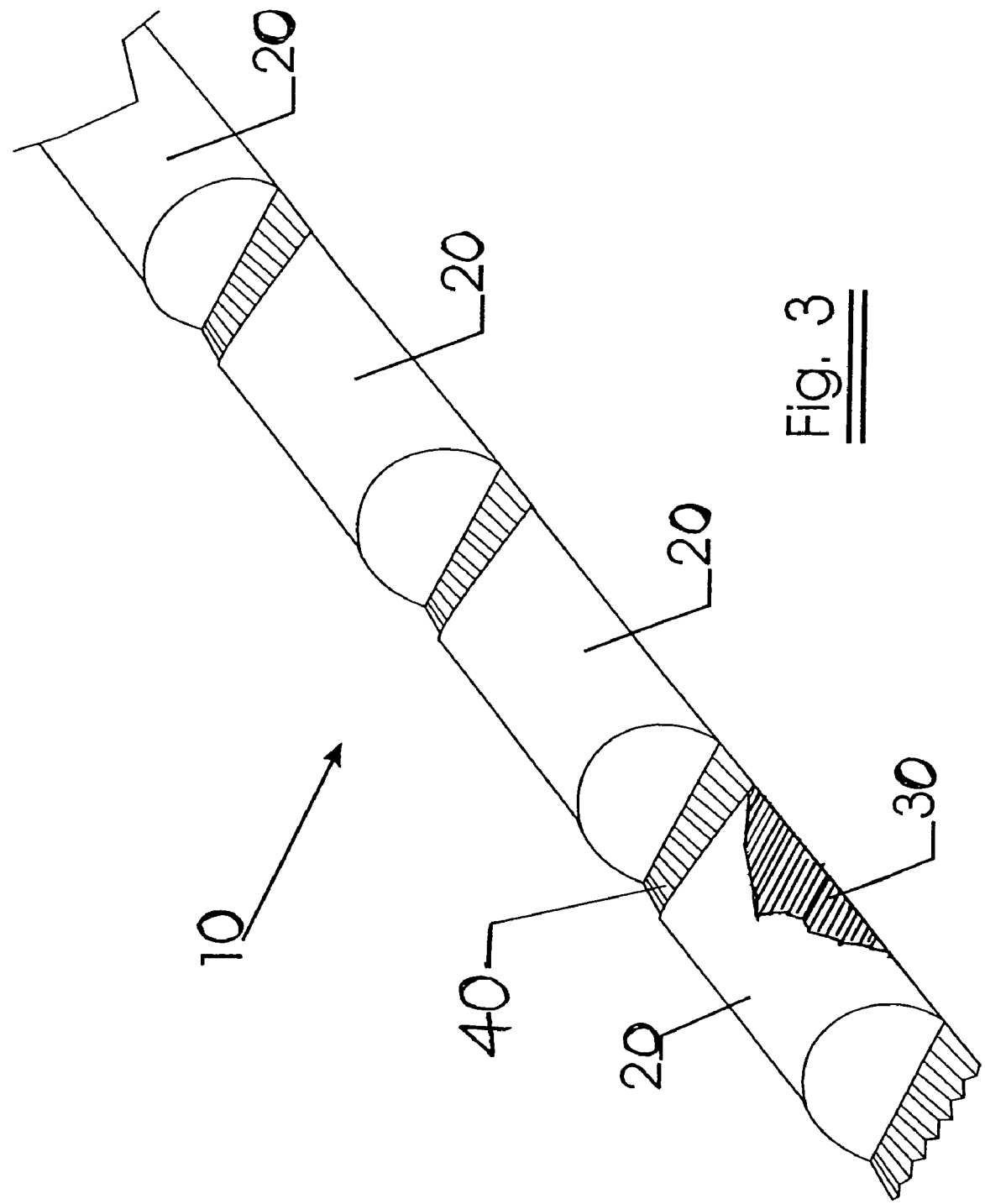

CLOSED REINFORCEMENT FIBER PACKAGE, AS WELL AS CHAIN PACKING CONSISTING OF SUCH CLOSED PACKAGES

CROSS-REFERENCE TO RELATED APPLICATIONS

This application is a continuation of application no. 10/687,973, filed Oct. 20, 2003, now U.S. Pat. No. 7,001,657 to Dewinter, which application is a continuation of application no. PCT/EP02/02455, filed Mar. 5, 2002, and which U.S. application no. PCT/EP02/02455 claims the priority of Belgium application no. 2001/0309, filed May 4, 2001, and each of which is incorporated herein by reference.

This application relates to Applicant's co-pending application Ser. No. 10/687,974, entitled "Method for Dosing Reinforcement Fibers for the Manufacturing Fiber Concrete and the Chain Packing Used", filed Oct. 20, 2003, now U.S. Pat. No. 6,945,686 to Dewinter; that co-pending application is a continuation of U.S. application no. PCT/EP02/04566, filed Apr. 24, 2002, which U.S. application no. PCT/EP02/04566 claims the priority of Belgium application no. 2001/0309, filed May 4, 2001.

The invention relates to a closed reinforcement fibre package consisting of a material disintegratable in fibre concrete, whereby the reinforcing fibres are present in a loose form in this package.

Such a closed reinforcement fibre package is already known from DE-A-4.214.540 and WO 95/11861.

A disadvantage of the addition of reinforcing fibres in a loose form during the concrete mixing operation for forming fibre concrete is that this process often results in a non-uniform dispersion or distribution of the reinforcing fibres in the formed fibre concrete.

The invention intends to avoid this aforementioned disadvantage.

Therefore, the invention proposes for a closed reinforcement fibre package mentioned in the opening lines that the reinforcing fibres are applied in a substantially mutually parallel position in this package.

Preferred embodiments of the closed reinforcement fibre package according to the invention are characterised in that the length of the reinforcing fibres substantially corresponds to the length of the package and that the fibres are situated lengthwise the package or that the length of the reinforcing fibres substantially corresponds to the width of the package and that the fibres are situated widthwise in the package.

It has now been found that an improved distribution or dispersion of the reinforcing fibres is obtained during the mixing operation of the fibre concrete when the loose reinforcing fibres are supplied into the concrete mixer in a substantially mutually parallel position or in closed packages according to the invention.

It has to be noted that it is already known to pack such reinforcing fibres in a substantially mutually parallel position. This is a.o. described in BE-A-1.003.656 (8901350). In this case, the ends of the parallel reinforcing fibres are coated and connected to each other a.o. by a special glue.

This is also described in WO 96/02715. In this case, the parallel reinforcing fibres are surrounded by a special casing material, whereas the ends of the parallel reinforcing fibres are not coated or surrounded by a casing material.

The great difference with the package according to the invention is that the package according to the invention is a closed package. A great advantage thereof is that the reinforcing fibres cannot be lost from this closed package during transport or the like. Therefore, such closed packages can be used to form a chain packing according to the invention.

In another preferred embodiment of the package according to the invention; the filling degree of the reinforcing fibres in the closed package is at least 75%.

In still another preferred embodiment of the package according to the invention, the reinforcing fibres are steel fibres.

By fibre concrete, we understand all curing materials, provided with reinforcing fibres, such as steel fibres, glass fibres and synthetic fibres, such as polypropylene fibres to improve the properties of the curable material.

This invention further relates to a chain packing consisting of a number of closed packages according to the invention.

In a preferred embodiment of the chain packing according to the invention, the packages are joined to each other.

In still a further preferred embodiment of the chain packing according to the invention; the packages are joined in line to each other.

A great advantage of such a chain packing according to the invention is that it is now possible to supply an exact quantity of reinforcing fibres to the mixing silo or concrete mixer in a very simple way.

The supply of the exact quantity of reinforcing fibres, such as steel fibres, is extremely difficult. This is certainly the case when the mixture operation is carried out on the building site itself.

Numerous solutions have already been proposed, such as EP-A-522.029 (WO 91/14551); EP-A-499.572; EP-A-499.573; DE 29714704U; DE-A-3.412.216; DE-A-4.427.156; FR-A-2.672.045 and many other patent documents.

A disadvantage of these known solutions is that they all need a rather complex dosing machine or weighing machine.

Another disadvantage is that the dosing or weighing of reinforcing fibres in a concrete mixing plant or on a building yard is a cumbersome and time-consuming operation.

Thanks to the use of such a chain packing according to the invention; it is now possible to supply an exact quantity of reinforcing fibres to the mixing silo or concrete mixer in a very simple way. It is now possible to supply a correct, well-defined quantity of reinforcing fibres in the closed packages, such as sacks, during the manufacturing of the reinforcing fibres. This makes it possible to supply the exact quantity of reinforcing fibres to the mixing silo by means of a conveyor belt, a roll system or a similar alimentation device, in which the former dosing or weighing operations are replaced by a measuring operation of the length of the continuous chain packing or a counting operation of the number of supplied packages to the mixing silo.

The invention will be further explained in the following description by means of the accompanying drawing.

Figure 2:
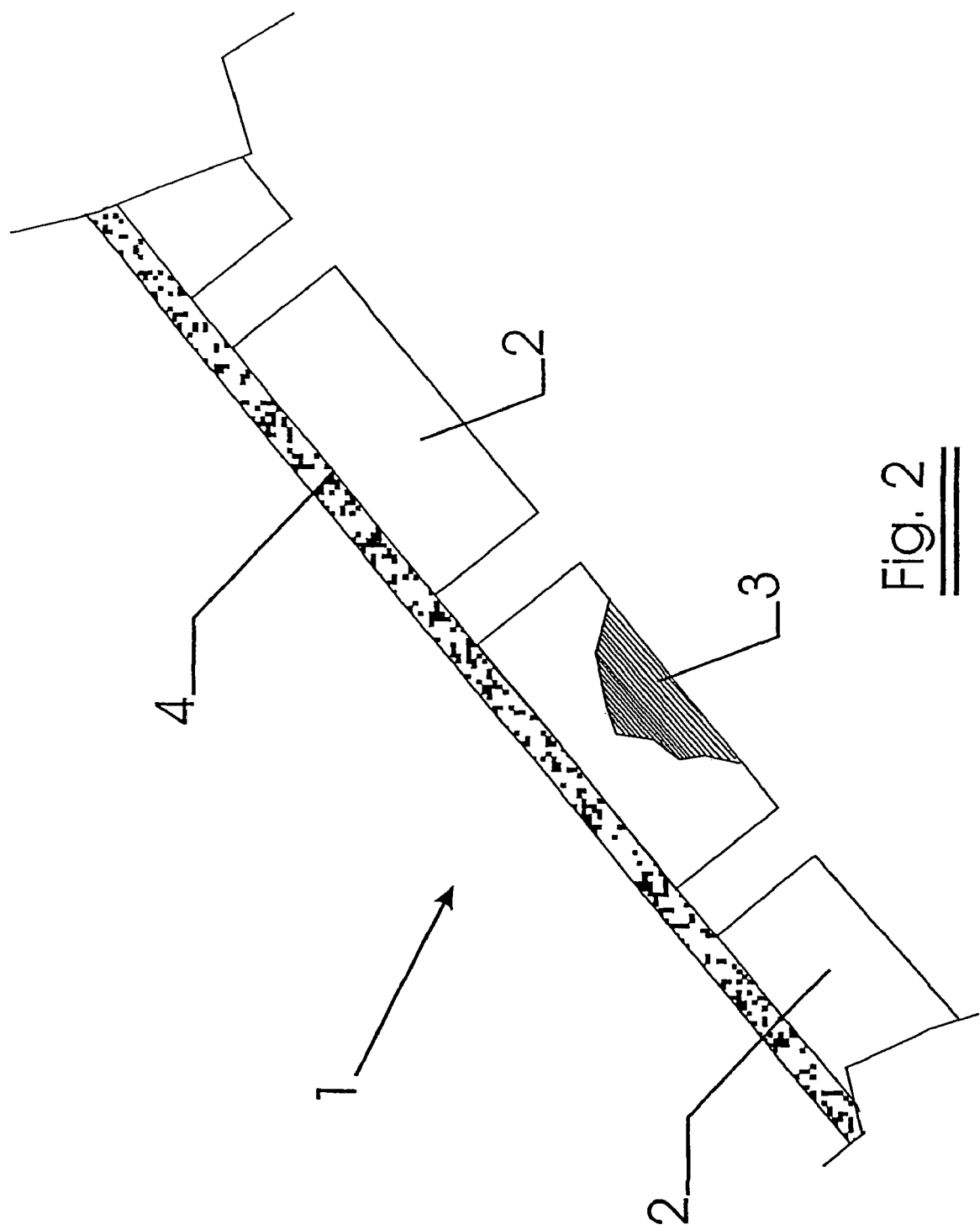

In the drawing,

FIGS. 1 and 2 give a representation, both schematically and in perspective of the closed fibre packages and parts of the chain packing according to the invention.

In FIG. 1, the chain packing according to the invention is generally indicated by 1. The chain packing consists of a large number of sacks 2 that are joined together. The sacks 2 may be made of a material that can be disintegrated in mortar or concrete. The sacks or packings 2 are completely closed.

As already mentioned above, it is already known to mix ingredients in concrete, stored in sacks, such as e.g. cellulose, which disintegrate in water. Preferably, a cellulose-based foil is used for the sacks 2; such foil will also be used as basic material for paper, possibly, such as known in the paper branch of industry, with addition of water-soluble glue and fillers, which are harmless to the concrete. The sacks can e.g. be glued together and closed with water-soluble heat-adhesive. But it is clear that every foil that disintegrates in the concrete water within the usual mixing time can be used.

In FIG. 1, the reinforcing fibres, packed in the sacks 2, are indicated by 3. The reinforcing fibres 3 can be made of all sorts of materials. This depends on the demands required of the fibres and on the fibre concrete to be reinforced. Preferably, steel reinforcing fibres 3 are used, sold amongst others by the applicant N.V. Bekaert S.A. under the brand name DRAMIX. Mostly, steel fibres 3 are used with a tensile force comprised e.g. between 500 and 3000 $N/mm^2$.

The used fibres can e.g. be straight. This is the simplest and cheapest version of reinforcing fibres that can be used for reinforcement. Preferably, the reinforcing fibres 3 have a form that makes it rather difficult to pull them out of the cured concrete material using a tensile strain. To that end, the fibres are e.g. corrugated or their cross-section-surface varies along the length. For steel fibres, the thickness or diameter preferably varies from 0.15 to 1.2 mm. The length-to-diameter ratio for steel fibres is, for practical and economical reasons, mostly situated between 10 and 200 and preferably minimally amounts to 40. For non-straight fibres, the length is the rectilinear distance between the ends of the fibres, whereas the diameter of fibres of which the diameter varies along the length is defined as the average diameter over the entire length.

As FIG. 1 shows, the reinforcing fibres 3 are preferably situated in a substantially mutually parallel position in the sack 2. In the event of steel fibres, the weight of the total number of fibres per sack 2 varies between 100 grams and 2 kg. It is also possible to use without any problems sacks weighing more than 2 kg.

The packing and weighing of steel fibres, such as described above, can be executed in line with the actual production of the steel fibres or on another spot, separated from the actual manufacturing of the steel fibres. It is e.g. possible to place the steel fibres 3 in a mainly mutual parallel position by means of magnetic forces.

Preferably, the length of the steel fibres 3 is practically identical to the length of the sack 2 and the steel fibres 3 are situated lengthwise the sack 2. The chain packing 1 preferably consists of sacks 2 that are joined in line. It is also possible to make sure that the length of the steel fibres 3 is practically identical to the width of the sacks 2 and that the fibres 3 are situated widthwise the sack 2.

Preferably, the packages or sacks 2 are substantially completely filled with the reinforcing fibres 3 so that the fibres 3 maintain their mutually parallel position during transport of the packages 2. It has been found that the filling degree of the reinforcing fibres 3 into the packages 2 should be at least 75% to maintain the mutually parallel position of the fibres 3 during the transport of the packages 2. By filling degree is understood the proportion or ratio between the volume of reinforcing fibres 3 and the volume of the sack or package 2.

It is obvious that the chain packing 1 according to the invention makes it now possible to easily supply such continuous packings 1 to the mixing silo by means of simple means of transportation, such as a conveyor belt, allowing in a simple way by means of a counter to count the number of sacks 2 or by means of a simple measuring device to measure the length of the supplied chain packing in order to easily define the supplied weight of reinforcing fibres 3 to the mixing silo.

FIG. 2 shows a chain packing 1, whereby the packages or sacks 2 are connected by means of one side thereof to a tape or strip 4. The strip 4 can be replaced by a wire, a cord or the like. The strip 4 is made of a material disintegratable in the concrete to be reinforced.

FIG. 3 shows a chain packing 10, wherein the packages or sacks 20 contain reinforcing fibers 30 having a length corresponding to the widths of sacks 20. Sacks 20 are connected on one side thereof to a tape or strip 40. The strip 40 can be replaced by a wire, a cord, and the like. The strip 40 is made of a material disintegratable in the concrete to be reinforced.

The invention claimed is:

1. A reinforcement fiber package, comprising:
  a) a closed sack having a length made of a package material which is disintegratable in concrete water;
  b) a plurality of reinforcing fibers having a length being provided loosely in the sack;
  c) the plurality of reinforcing fibers being provided in a substantially mutually parallel position in the sack;
  d) the length of the respective reinforcing fibers being substantially the same as the length of the sack;
  e) the reinforcing fibers being provided lengthwise in the sack;
  f) the filling degree of the reinforcing fibers being sufficiently full to maintain the substantially mutually parallel position of the plurality of reinforcing fibers in the sack; and
  g) the plurality of reinforcing fibers is made of steel.

2. Package as in claim 1, wherein:
  a) the filling degree of the reinforcing fibers is at least 75%.

3. A reinforcement fiber package, comprising:
  a) a number of closed sacks joined together; and
  b) each sack having a length and including:
    i) a package material which is disintegratable in concrete water;
    ii) a plurality of reinforcing fibers being provided loosely in each sack;
    iii) the plurality of reinforcing fibers being provided in a substantially mutually parallel position in each sack; and
  c) the filling degree of the reinforcing fibers being at least 75%.

4. A package as in claim 3, wherein:
  a) the number of sacks are joined to each other in a line.

5. A package as in claim 3, wherein:
  a) the package material includes a cellulose-based foil.

6. A package as in claim 3, wherein:
  a) the plurality of reinforcing fibers includes straight fibers.

7. A package as in claim 3, wherein:
  a) the plurality of reinforcing fiber includes fibers having a variable cross section.

8. A package as in claim 3, wherein:
  a) the number of closed sacks is joined to each other by a strip.

9. Package as in claim 1, wherein:
  a) the package material includes a cellulose-based foil.

10. Package as in claim 1, wherein:
  a) the plurality of reinforcing fibers includes straight fibers.

11. Package as in claim 1, wherein:
  a) the plurality of reinforcing fiber includes fibers having a variable cross section.

12. A reinforcement fiber package, comprising:
  a) a number of closed sacks having a length and joined together in a chain, each sack being made of a package material which is disintegratable in concrete water;
  b) a plurality of reinforcing fibers having a length being provided loosely in the sacks;
  c) the plurality of reinforcing fibers being provided in a substantially mutually parallel position in the sacks;

d) the length of the respective reinforcing fibers being substantially the same as the length of the sacks;
e) the reinforcing fibers being provided lengthwise in the sacks;
f) the plurality of reinforcing fibers being made of steel; and
g) the filling degree of the reinforcing fibers being sufficiently full to maintain the substantially mutually parallel position of the plurality of reinforcing fibers in the sack.

13. A package as in claim 3, wherein:
a) the number of closed packages is joined to each other by a strip.

14. A reinforcement fiber package, comprising:
a) a closed sack having a length and a width, and being made of a package material which is disintegratable in concrete water;
b) a plurality of reinforcing fibers having a length being provided loosely in the sack;
c) the plurality of reinforcing fibers being provided in a substantially mutually parallel position in the sack;
d) the length of the respective reinforcing fibers is substantially the same as a width of the sack;
e) the reinforcing fibers are provided widthwise in the sack;
f) the plurality of reinforcing fibers is made of steel; and
g) the filling degree of the reinforcing fibers being sufficiently full to maintain the substantially mutually parallel position of the plurality of reinforcing fibers in the sack.

15. A package as in claim 12, wherein:
a) the number of closed sacks is joined to each other by a strip.

16. Package as in claim 14, wherein:
a) the filling degree of the reinforcing fibers is at least 75%.

17. Package as in claim 12, wherein:
a) the filling degree of the reinforcing fibers is at least 75%.

* * * * *